(12) United States Patent
Lee et al.

(10) Patent No.: US 7,635,819 B2
(45) Date of Patent: Dec. 22, 2009

(54) KEYPAD ASSEMBLY HAVING REFLECTION PATTERN

(75) Inventors: Joo-Hoon Lee, Yongin-si (KR); Sun-Tae Jung, Anyang-si (KR); Kyoung-Youm Kim, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/319,841

(22) Filed: Dec. 28, 2005

(65) Prior Publication Data

US 2006/0260921 A1    Nov. 23, 2006

(30) Foreign Application Priority Data

May 19, 2005    (KR)    .............. 10-2005-0042039

(51) Int. Cl.
*H01H 9/00*    (2006.01)
(52) U.S. Cl. .................... 200/313; 200/314
(58) Field of Classification Search ............ 200/313
See application file for complete search history.

(56) References Cited

U.S. PATENT DOCUMENTS 5,128,842 A * 7/1992 Kenmochi ............... 362/95
5,408,060 A * 4/1995 Muurinen ................ 200/314
5,573,107 A * 11/1996 Nakano et al. ............ 200/314
5,577,267 A * 11/1996 Jungles-Butler et al. . 455/575.1
5,664,667 A * 9/1997 Kenmochi ............... 200/314
6,747,226 B2 * 6/2004 Watanabe ................ 200/520
6,886,956 B2 * 5/2005 Parker et al. .............. 362/29

FOREIGN PATENT DOCUMENTS

| | | |
|---|---|---|
| JP | 02-62630 | 5/1990 |
| JP | 06-076684 | 3/1994 |
| JP | 07-056022 | 3/1995 |
| JP | 2000-089032 | 3/2000 |
| JP | 2001-167655 | 6/2001 |
| JP | 2003-178639 | 6/2003 |
| JP | 2003-308752 | 10/2003 |
| JP | 2004-200093 | 7/2004 |
| JP | 2005-050709 | 2/2005 |
| WO | WO 2004/112069 | 12/2004 |

* cited by examiner

*Primary Examiner*—Renee S Luebke
*Assistant Examiner*—Lheiren Mae A Anglo
(74) *Attorney, Agent, or Firm*—Cha & Reiter, LLC

(57) ABSTRACT

A keypad assembly includes a light guide plate adapted to transmit light and comprising a supporting portion and an elastic portion made of different material than material of the supporting portion, at least one key button disposed on the side of the light guide plate where a first surface of the light guide plate is located, and at least one reflection pattern locally formed on the light guide plate and adapted to reflect light transmitted into the light guide plate toward the key button. The elastic portion is disposed below the key button.

10 Claims, 3 Drawing Sheets

KEYPAD ASSEMBLY HAVING REFLECTION PATTERN

CLAIM OF PRIORITY

This application claims priority to an application filed with the Korean Intellectual Property Office on May 19, 2005 and assigned Serial No. 2005-42039, the contents of which are incorporated herein by reference.

BACKGROUND OF THE INVENTION

1. Field of the Invention

The present invention relates to a keypad assembly having reflection pattern.

2. Description of the Related Art

Generally, a keypad assembly of the conventional portable terminal includes a keypad. A keypad assembly may have a switch substrate. The keypad includes a plate-shaped elastic layer and a plurality of key buttons formed on a first surface of the elastic layer. In the keypad, characters and the like are respectively printed on each surface of the key button. The switch substrate on which a plurality of switches is integrated to provide electric contact as the respective key button is pushed, resulting in converting a press to the respective key button into electric signal.

A portable terminal has lighting elements for a user to use the keypad even in the dark. A plurality of light emitting diodes and inorganic electro luminescence are used as the lighting elements. The light emitting diodes are generally arranged on a printed circuit board, while the inorganic electro luminescence is inserted in an elastic pad.

FIG. 1 is a sectional view showing a keypad assembly 100 including a plurality of light emitting diodes according to the conventional art. Referring to FIG. 1, the conventional keypad assembly 100 includes a switch substrate 120, a plurality of diodes 122 and a keypad 110.

The keypad 110 includes a plate-shaped elastic layer 111, a plurality of key buttons 112 formed on a first surface of the elastic layer 111 and on each of which characters and the like are printed, and a plurality of protrusions 111a formed on a second surface of the elastic layer 111 opposite to the first surface. Each key button 112 and the corresponding protrusion 111a are aligned vertically.

The switch substrate 120 includes a plate type printed circuit board 120a and a plurality of switches 121 formed on an upper surface of the printed circuit board 120a while being opposed to the keypad 110. Each switch 121 includes a conductive contact member and a conductive dome fully covering the contact member. The light emitting diodes 122 are mounted on the upper surface of the printed circuit board 120a.

Each light emitting diode 122 is preferably prevented from being located in vertical alignment with a corresponding key button 112, in order to ensure operation of the switch 121. That is, the light emitting diodes 122 are respectively placed between the switches 121, so as to emit the light to the respective key buttons 112 at an oblique angle. The emitted light may unevenly reach each key button 112. Therefore, the respective key buttons may be shaded in darkness.

Therefore, a keypad assembly was proposed which includes a keypad having an elastic layer and inorganic electro luminescence inserted in the elastic layer. However, a separate AC electric source is necessary in order to use the inorganic electro luminescence. That is, the keypad assembly including the inorganic luminescence may have an inverter in order to convert DC to AC. As a result, a volume and a manufacturing cost of the keypad assembly may increase. In addition, DC to AC conversion may generate noise in the portable terminal.

SUMMARY OF THE INVENTION

A keypad assembly includes a light guide plate adapted to transmit light and comprising a supporting portion and an elastic portion made of different material than material of the supporting portion, at least one key button disposed on the side of the light guide plate where a first surface of the light guide plate is located, and at least one reflection pattern locally formed on the light guide plate and adapted to reflect light transmitted into the light guide plate toward the key button. The elastic portion is disposed below the key button.

BRIEF DESCRIPTION OF THE DRAWINGS

The above features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described with reference to the accompanying drawings. In the following description of the present invention, a detailed description of known functions and configurations incorporated herein is omitted to avoid making the subject matter of the present invention unclear.

Figure 1:
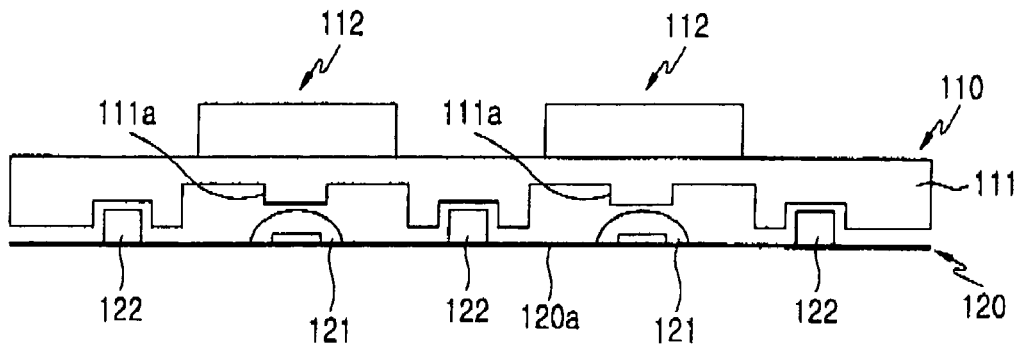
FIG. 1 is a sectional view showing a keypad assembly for a portable terminal according to the conventional art.
Figure 2:
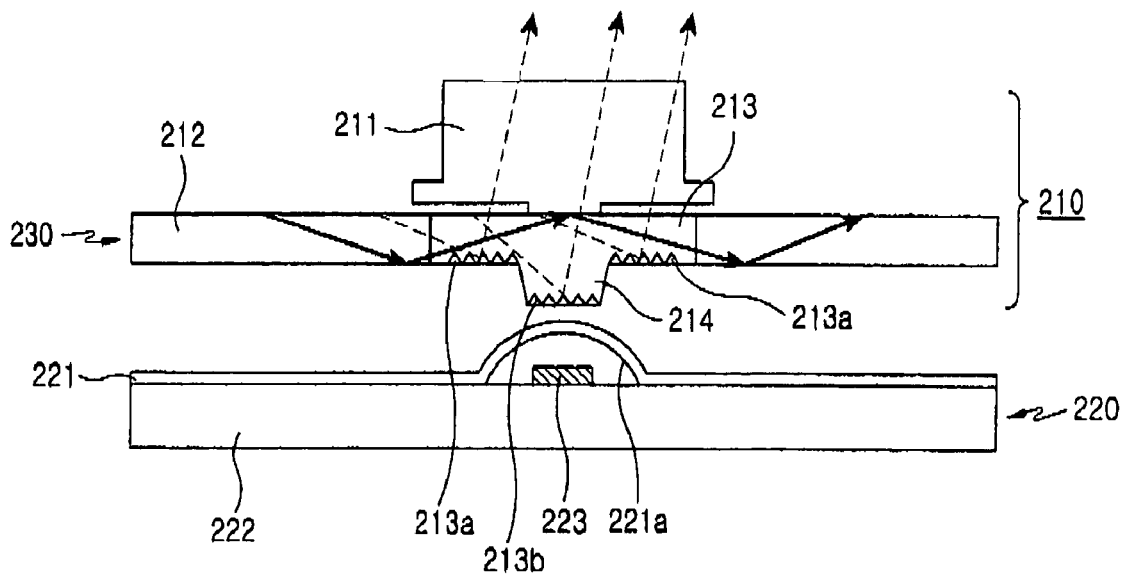
FIG. 2 is a sectional view showing a keypad assembly for a portable terminal according to a first embodiment of the present invention.

FIG. 2 is a sectional view showing a keypad assembly 200 according to a first embodiment of the present invention. The keypad assembly 200 according to this embodiment of the present invention includes a keypad 210 and a switch substrate 220.

The keypad 210 includes a light guide plate 230 having first and second surfaces, at least one key button 211 formed on the first surface of the light guide plate 230 and at least one reflection pattern 213a and 213b locally formed on the second surface of the light guide plate 230.

The light guide plate 230 includes a supporting portion 212 and an elastic portion 213, which has at least one protrusion 214 formed on the second surface thereof and the key buttons 211 on the first surface thereof. The light guide plate 230 transmits the incident light introduced into the light guide plate 230. The reflection patterns 213a and 213b reflects some of the transmitted light toward the key buttons 211. Further, since the light guide plate 230 is a plane plate in which the first and second surfaces are flat, a critical angle for total reflection may be regularly maintained in the entire light guide plate 230 so that light loss can be significantly decreased.

The supporting portion 212 is made of one or combination of polyethylene resin, polycarbonate resin, poly methyl methacrylic resin and acryl based resin in a manner of injection molding. Despite the supporting portion 212 being formed of, for example, low elastic deformation, low elastic stability and high hardness, it is desirable in an exemplary embodiment of the present invention to secure a preferable touch when a user pushes key buttons. Further, it is desirable in an exemplary embodiment of the present invention to reduce interference between the key buttons, where when one of the key buttons is touched, adjacent key buttons may be operated along with the key button. Meanwhile, it is desirable in an exemplary embodiment of the present invention to avoid permanent deformation when key buttons are repeatedly operated.

Therefore, the elastic portion 213 may be made of transparent resin material having high transmittance as well as low hardness, high elastic deformation and high stability to prevent permanent deformation during a repeat operation, while being disposed below the corresponding key button 211 in order to improve the touch for the key button 211 and to restrict interference among the key buttons 211. Preferably, the elastic portion 213 is made of polyurethane, silicone and the like. Alternatively, the elastic portion 213 may be made of elastomer.

The switch substrate 220 includes a printed circuit board 222 and a dome sheet 221. The printed circuit board 222 is provided with a plurality of conductive contact members 223 formed on the upper surface thereof. The respective contact member 223 along with the corresponding dome 221a constitutes a switch. Furthermore, the switch 223 and 221a is vertically aligned below the corresponding protrusion 214.

Figure 3:
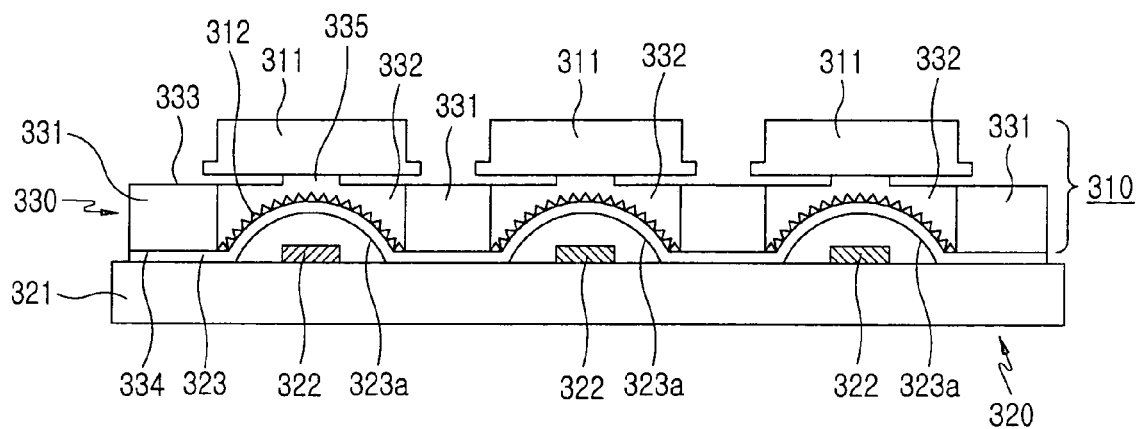
FIG. 3 is a sectional view showing a keypad assembly for a portable terminal according to a second embodiment of the present invention.

FIG. 3 is a sectional view showing a keypad assembly according to a second embodiment of the present invention. The keypad assembly 300 according to this embodiment includes a keypad 310 having at least one key button 311 and a switch substrate 320 having at least one switch while being disposed below the keypad 310.

The keypad 310 includes a light guide plate 330 having a supporting portion 331 and an elastic portion 332 which are made of different materials to transmit the incident light, at least one key button 311 and at least one reflection pattern 312 to reflect the light transmitted in the light guide plate 330 toward the key buttons 331.

The light guide plate 330 has a plane plate including first and second surfaces 333 and 334, which transmits the incident light therein. The light guide plate 330 may have any shape including square, etc. The light introduced in the light guide plate 330 is totally reflected by a boundary surface between the light guide plate and atmosphere to be transmitted into the light guide plate 330. The above-mentioned light can be introduced through a side of the light guide plate 330 into the light guide plate 330. Light emitting diodes can be used as a light source to emit the light.

In the light guide plate 330, as the first and second surfaces 333 and 334 are parallel with each other, the critical angle for the total reflection can be maintained in the light guide plate 330 so that light loss can be significantly decreased. However, since a portion of the light guide plate 330 corresponding to the dome switch is inclined, the light loss may be created due to the change of the critical angle. Meanwhile, such arrangement may reduce the thickness of the keypad 310 including the dome switch. The larger an incline angle of a portion of the second surface 334 contacting with the switch becomes, the more light loss increases as the light is not reflected but transmitted at the critical angle to the total reflection. Thus, the incline angle of the portion of the second surface 334 contacting with the switch preferably is maintained below 10 degrees.

The elastic portion 332 has at least one protrusion 335 to respectively correspond to each key button 331. The protrusions 335 are made of the same material as the light guide plate 330, or of different material from the light guide plate 330 so as to be integrated with the elastic portion 332. However, the protrusions 335 and the elastic portion 332 can be separately made before the protrusions 335 are respectively adhered to the first surface 333 of the light guide plate 330, i.e. each elastic portion, by using adhesive. The respective protrusion 335 may have an arbitrary shape such as cone, trapezoidal hexahedron and the like. The respective protrusion 335 is vertically aligned below the corresponding key button 311.

Further, impurities are separately added to the supporting portion 331 and the elastic portion 332 in order to minimize difference of a refractive index between the supporting portion 331 and the elastic portion 332. Thus, the light loss can be decreased due to the difference of the refractive index at the boundary between the supporting portion 331 and the elastic portion 332. The light guide plate 330 has the elastic portions 332 formed in such a manner that after each supporting portion 331 having a hole formed at a position corresponding to the respective elastic portion 332 is formed by injection molding, silicon and the like is injected or inserted in the hole. In order to provide easy processes and to reinforce the adhesive strength, the supporting portion can be wholly coated with elastomer.

The plurality of key buttons 311 are formed on the elastic portion 332 of the first surface 333, which have characters, numbers and the like respectively printed on an upper surface thereof. The key buttons 311 are made of the same material as the light guide plate 330, or of different material from the light guide plate 330 so as to be integrated with the elastic portion 332. On the other hand, the key buttons 31 may be made of polycarbonate or acryl-based resin before being adhered to the first surface 333 of the light guide plate 330 using adhesive.

The reflection patterns 312 are respectively and partially formed on the second surface 334 opposite to the first surface of the light guide plate 330, which can reflect the light transmitted in the light guide plate 330 toward the respective key button 311. Furthermore, diffusion agent is added to the elastic portion 332. Thereby, it is possible to reflect the light transmitted in the elastic portion toward the respective key button 311. Further, the reflection patterns 312 are sparsely formed at a portion near the light source while being densely formed at a portion far from the light source, resulting in reflecting the light with uniform brightness to the respective key button 311.

The switch substrate 320 includes a printed circuit board 321 and a dome sheet 323. The printed circuit board 321 has a plurality of conductive contact members 322 formed on an upper surface thereof. The respective contact member 322 constitutes a switch 323a and 322 along with the corresponding protrusion 335. The switch 323a and 322 is vertically aligned below the protrusion 335.

The dome sheet 323 is seated on the upper surface of the printed circuit board 321, which includes a plurality of conductive domes 323a having a hemispheric shape. The respective dome 323a fully covers the corresponding contact member 322.

When a user pushes any one of the key buttons 311, the part of the elastic portion 332 placed below the key button 311 is transformed and urged toward the switch substrate 320, which in turn presses the dome 323a. The pressed dome 323a comes in electric contact with the corresponding contact member 322.

Figure 4:
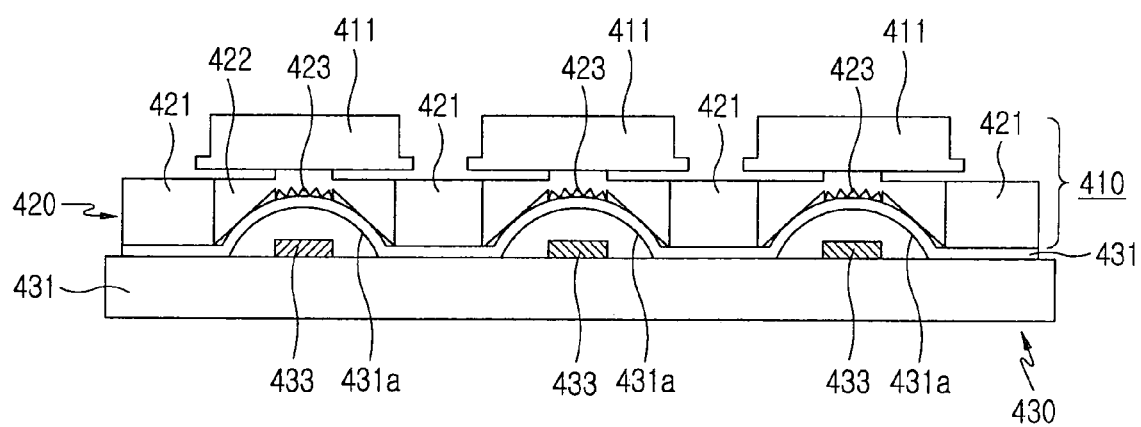
FIG. 4 is a sectional view showing a keypad assembly for a portable terminal according to a third embodiment of the present invention.

FIG. 4 is a sectional view showing a keypad assembly for a portable terminal according to the third embodiment of the present invention. The keypad assembly 400 according to this embodiment includes a keypad 410 having at least one key button 411 and a switch substrate 430 which is disposed below the keypad 410 and which has at least one switch 433 and 431a. A portable terminal may be any wireless communication terminal including but not limited to mobile telephones, PDAs and computers.

The keypad 410 includes a light guide plate 420 which has a supporting portion 421 and an elastic portion 422 made of different materials, for transmitting light in the light guide plate 420, at least one key button 411 and at least one reflection pattern 423 which reflects the light into the light guide plate 420 toward the key buttons 411.

The light guide plate 420 includes the supporting portion 421 and the elastic portion 422 which are made of different materials, which has plate shape including first and second surfaces. The key buttons 411 are formed on the elastic portion 422 of the first surface of the light guide plate 420, while the elastic portions 422 respectively have a protrusion extending from each elastic portion 422 toward the corresponding key button 411.

The reflection patterns 423 may be formed on the elastic portion 422 of the second surface of the light guide plate 420 in a manner of scratching the elastic portion 422 or printing the reflection pattern 423 on the elastic portion 422. It will be understood that incline surfaces of the elastic portions 422 respectively contacting with each dome 431a have declined at a predetermined angle with respect to the switch substrate 430, as shown in FIG. 4.

Figure 5:
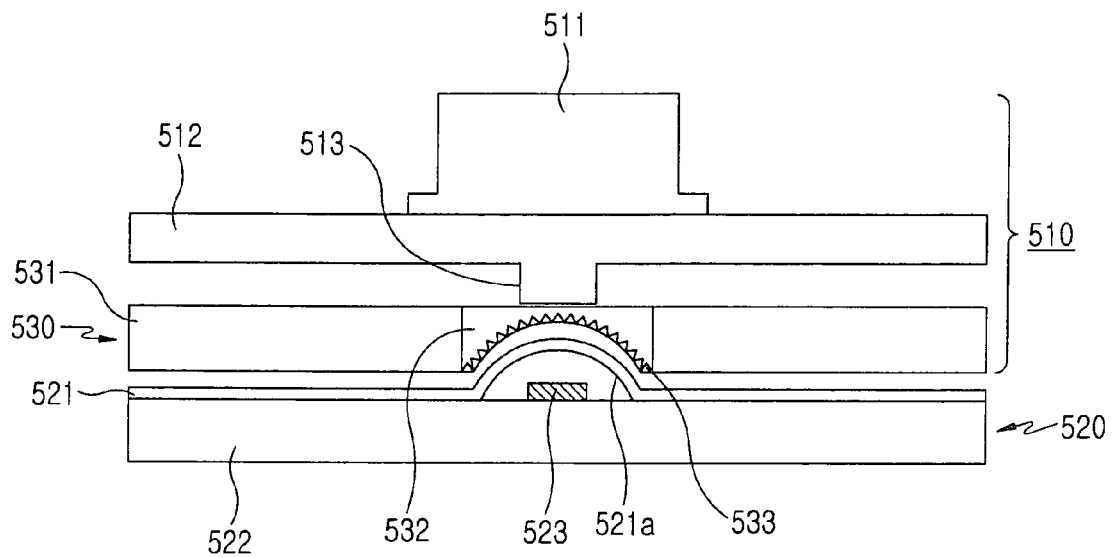
FIG. 5 is a sectional view showing a keypad assembly for a portable terminal according to a fourth embodiment of the present invention.

FIG. 5 is a sectional view showing a keypad assembly for a portable terminal according to a fourth embodiment of the present invention. The keypad assembly according to this embodiment includes a keypad 510 and a switch substrate 520.

The keypad 510 includes at least one key button 511, a light guide plate 530 which has a supporting portion 531 and an elastic portion 532 made of different material, for transmitting light into the light guide plate 531, at least one reflection pattern 533 which is locally formed on the light guide plate 530, for reflecting the light transmitted into the light guide plate 530 toward the respective key button 511 and an elastic layer 512 which is disposed between the light guide plate 530 and the key button 511.

The elastic layer 512 further includes a protrusion 513 facing the elastic portion 532. The protrusion 513 can improve the sense of touch relating to the corresponding key button 511.

The switch substrate 520 includes a printed circuit board 522 and a dome sheet 513. The printed circuit board 522 is provided with a plurality of conductive contact members formed on an upper surface of the printed circuit board 522. The respective contact member 523 along with the corresponding dome 521a constitutes a switch 521a and 523. Further, the switch 521a and 523 is vertically aligned below the corresponding protrusion 513.

Figure 6:
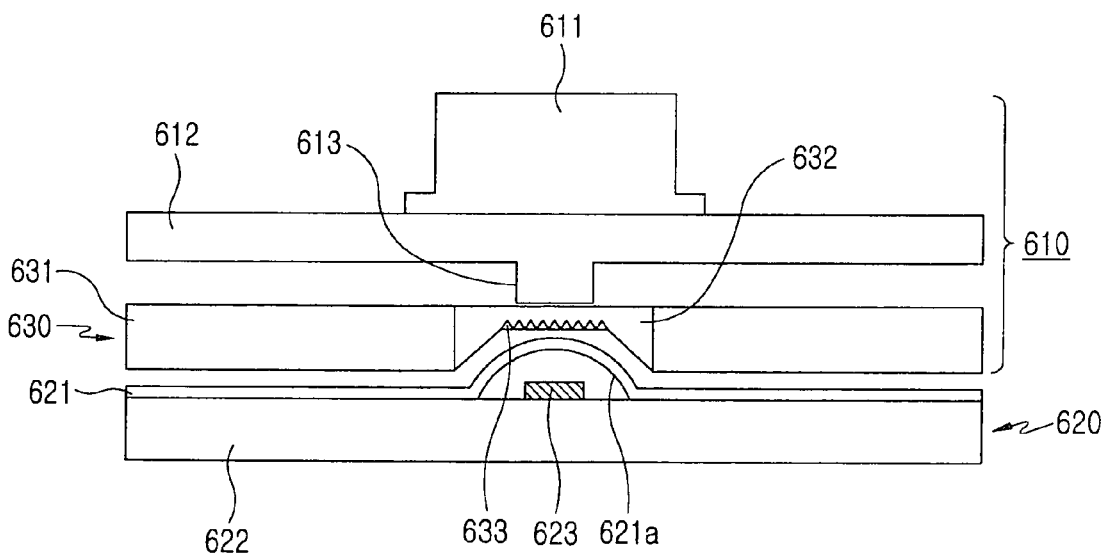
FIG. 6 is a sectional view showing a keypad assembly for a portable terminal according to a fifth embodiment of the present invention.

FIG. 6 is a sectional view showing a keypad assembly for a portable terminal according to a fifth embodiment of the present invention. The keypad assembly 600 according to this embodiment includes a keypad 610 having at least one key button 611, and a switch substrate 620.

The keypad 610 includes at least one key button 611, a light guide plate 630 which has a supporting portion 631 and an elastic portion 632 made of different materials, for transmitting light into the light guide plate 630, at least one reflection pattern 633 which is locally formed on the light guide plate 630, for reflecting the light transmitted into the light guide plate 630 toward the key button 611, and an elastic layer 612 which is disposed between the light guide plate 630 and the key button 611.

The switch substrate 620 includes a printed circuit board 622 and a dome sheet 621. The printed circuit board 622 is provided with a plurality of conductive contact members 623 on an upper surface thereof. The respective contact member 623 along with the corresponding dome 621a constitutes the switch 623 and 621a. Further, the switch 623 and 621a is vertically aligned below the corresponding protrusion 613.

In this embodiment, the elastic portion has a trapezoid shape in the sectional view, which has the reflection patterns 633 formed on one surface thereof facing the dome 621a.

The present invention transmits the light through the light guide plate from the light source to the key buttons with a uniform brightness while including a minimum number of light emitting elements such as light emitting diodes and can minimize the power consumption. Further, the present invention can significantly reduce the cost of manufacturing the keypad assembly. In addition, the present invention includes the light guide plate consisting of two materials. Therefore, the pressure of the key button can be locally transferred to the keypad, thereby preventing malfunctions of adjacent key buttons.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A keypad assembly comprising:
   a light guide plate adapted to transmit light therethrough, the light being incident to an edge of said light guide plate, said light guide plate comprising an integrated supporting portion and an elastic portion, said elastic portion made of a material different than that of the supporting portion;
   at least one key button disposed on a first surface of the light guide plate, said key button being vertically disposed with regard to a corresponding elastic portion; and
   at least one reflection pattern locally formed within the elastic portion of said light guide plate and adapted to reflect light transmitted into the light guide plate toward the key button.

2. The keypad assembly as claimed in claim 1, wherein the reflection pattern is formed on a second surface opposite to the first surface of the light guide plate.

3. The keypad assembly as claimed in claim 1, further comprising:
   at least one protrusion formed on a second surface opposite to the first surface of the light guide plate.

4. The keypad assembly as claimed in claim 3, wherein the reflection pattern is formed on the protrusion and at a periphery of the protrusion.

5. The keypad assembly as claimed in claim 1, further comprising
   a substrate having at least one switch disposed on a surface of the substrate facing the light guide plate.

6. A portable wireless communication terminal comprising:

a light guide plate adapted to transmit light therethrough, the light being incident to an edge of said light guide plate, said light guide plate comprising an integrated supporting portion and an elastic portion, said elastic portion made of a material different than that of the supporting portion;

at least one key button disposed on a first surface of the light guide plate, said key button being vertically disposed with regard to a corresponding elastic portion; and at least one reflection pattern locally formed within the elastic portion of said light guide plate and adapted to reflect light transmitted into the light guide plate toward the key button.

7. The portable wireless communication terminal as claimed in claim 6, wherein the reflection pattern is formed on a second surface opposite to the first surface of the light guide plate.

8. The portable wireless communication terminal as claimed in claim 6, further comprising:

at least one protrusion formed on a second surface opposite to the first surface of the light guide plate.

9. The portable wireless communication terminal as claimed in claim 8, wherein the reflection pattern is formed on the protrusion and at a periphery of the protrusion.

10. The portable wireless communication terminal as claimed in claim 6, further comprising:

a substrate having at least one switch disposed on a surface of the substrate facing the light guide plate.

* * * * *